US012045680B2

(12) United States Patent
Stillman et al.

(10) Patent No.: US 12,045,680 B2
(45) Date of Patent: *Jul. 23, 2024

(54) BARCODE-BASED ENROLLMENT OF DEVICES WITH A MANAGEMENT SERVICE (71) Applicant: VMware LLC, Palo Alto, CA (US)

(72) Inventors: Eric Stillman, Atlanta, GA (US); Stephen Paulus, Northfield, OH (US); Nicholas Boncek, Strongsville, OH (US); Raghu Mummadi, Atlanta, GA (US); Perron Jones, Atlanta, GA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,308

(22) Filed: May 20, 2022

(65) Prior Publication Data
US 2022/0277179 A1 Sep. 1, 2022

Related U.S. Application Data (63) Continuation of application No. 17/029,618, filed on Sep. 23, 2020, now Pat. No. 11,341,386, which is a continuation of application No. 15/872,365, filed on Jan. 16, 2018, now Pat. No. 10,789,518.

(51) Int. Cl.
G06K 19/06 (2006.01)
G06K 7/14 (2006.01)
H04L 9/08 (2006.01)
H04L 9/32 (2006.01)

(52) U.S. Cl.
CPC ..... *G06K 19/06028* (2013.01); *G06K 7/1413* (2013.01); *H04L 9/0861* (2013.01); *H04L 9/3226* (2013.01)

(58) Field of Classification Search
CPC ............ G06K 19/06028; G06K 7/1413; H04L 9/0861; H04L 9/3226; G06Q 30/016
See application file for complete search history.

(56) References Cited

U.S. PATENT DOCUMENTS

| | | | |
|---|---|---|---|
| 10,180,834 B2 * | 1/2019 | Turner | H04L 67/34 |
| 10,992,656 B2 * | 4/2021 | Liderman | H04L 9/0861 |
| 11,030,453 B2 | 6/2021 | Rowe et al. | |
| 2012/0240204 A1 | 9/2012 | Bhatnagar et al. | |
| 2013/0024379 A1 | 1/2013 | Di Tucci et al. | |
| 2013/0111208 A1 | 5/2013 | Sabin et al. | |
| 2014/0282210 A1 * | 9/2014 | Bianconi | G06K 7/1447 715/780 |
| 2014/0282960 A1 * | 9/2014 | Tinnakornsrisuphap | H04L 63/083 726/7 |
| 2017/0012783 A1 * | 1/2017 | Moses | H04L 9/006 |
| 2018/0262486 A1 | 9/2018 | Zhu et al. | |

* cited by examiner

Primary Examiner — Sonji N Johnson
(74) Attorney, Agent, or Firm — Kim & Stewart LLP (57) ABSTRACT Various examples for providing an enrollment barcode to a staging client are provided. Enrollment data can be provided to a barcode service, which generates an enrollment barcode. Interpreting the enrollment barcode by a client device causes a management component installed on the client device to authenticate to a management service using a staging credential encrypted or secured in the enrollment barcode, and causes the enrollment of the client device with the management service.

20 Claims, 4 Drawing Sheets

BARCODE-BASED ENROLLMENT OF DEVICES WITH A MANAGEMENT SERVICE

CROSS-REFERENCE TO RELATED APPLICATIONS

This application is a continuation of and claims priority to application Ser. No. 17/029,618 filed Sep. 23, 2020 and titled "BARCODE-BASED ENROLLMENT OF DEVICES WITH A MANAGEMENT SERVICE," which is a continuation of and claims priority to Ser. No. 15/872,365 filed on Jan. 16, 2018 and titled "BARCODE-BASED ENROLLMENT OF DEVICES WITH A MANAGEMENT SERVICE," having U.S. Pat. No. 10,789,518, which is incorporated by reference herein in their entireties.

BACKGROUND

Mobile devices, such as smartphones, tablet devices, barcode scanning devices, ruggedized computing devices, or other devices, are often used in various enterprise, retail, and business settings. These devices are often purchased from an OEM manufacturer or a distributer and are provided without the applications, services, credentials, profiles and other data that a customer might require to make the device usable by their workers. For example, a retailer might acquire ruggedized barcode scanners that run a particular operating system. However, to make the devices usable by their employees, various applications and data are required to be installed onto the device. Additionally, to aid in the management of the device, the retailer might require the device to be enrolled with an enterprise mobility management (EMM) service. However, the applications, profiles, and policies that facilitate enrollment of the device with a management service may not be pre-installed on the device by the OEM. Administrators of the management service can utilize the management service to oversee operation of the devices enrolled with or otherwise managed by the service.

Some OEMs, particularly of ruggedized devices that are used in a retail or warehouse environment where barcodes are used to track inventory or perform other tasks, may ship devices that have a staging client preinstalled on the device along with the operating system. The staging client can allow the device to take certain actions that are embedded within a staging barcode.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Aspects of the present disclosure relate to barcode based enrollment of client devices with a management service. In some situations, it can be problematic for an end user to enroll a device with a management service, which might be required by an enterprise. For example, in a retail or warehouse environment, ruggedized devices are often used to complete various tasks. The end users of the devices may not have user accounts within the enterprise or the enterprise may not wish to train the end user regarding the procedures needed to enroll a device with an enterprise mobility management (EMM) service or a management service. Beyond enrollment, there are also other applications, policies, profiles, and other configuration that might be required on the device before it is usable in a particular enterprise environment. For example, setup of the device might require adding the device to a particular organizational group ("OG") within a directory service of the enterprise. Setup of the device might also require certain WiFi credentials, identity certificates, applications, profiles, or other data to be loaded onto the device before it can be used within the enterprise.

Accordingly, barcode based enrollment processes can be utilized to simplify the enrollment and setup of a device. A barcode enrollment process can involve a staging client that has been installed onto a device by the OEM scanning a barcode that instructs the staging client how to perform initial setup of the device and enrollment of the device with a management service. However, the OEM might have a proprietary mechanism in place to generate an enrollment barcode. The entity operating a management service with which the device is to be enrolled might be different from the OEM. Additionally, the enterprise might be yet another entity that is different from the entity operating the management service. Accordingly, the enrollment credentials and other information within an enrollment barcode can be considered sensitive information that the entity operating the management service might wish to keep secure. Additionally, the OEM might wish to maintain control over the process used to generate enrollment barcodes that are interpreted by the staging client on the client device.

Therefore, examples of the disclosure involve systems and methods that can cause an enrollment barcode to be generated by a barcode service that, when scanned by a staging client on a client device, can cause the device to automatically enroll itself with a management service and install other applications and data on the device as directed by the enrollment barcode.

Figure 1:
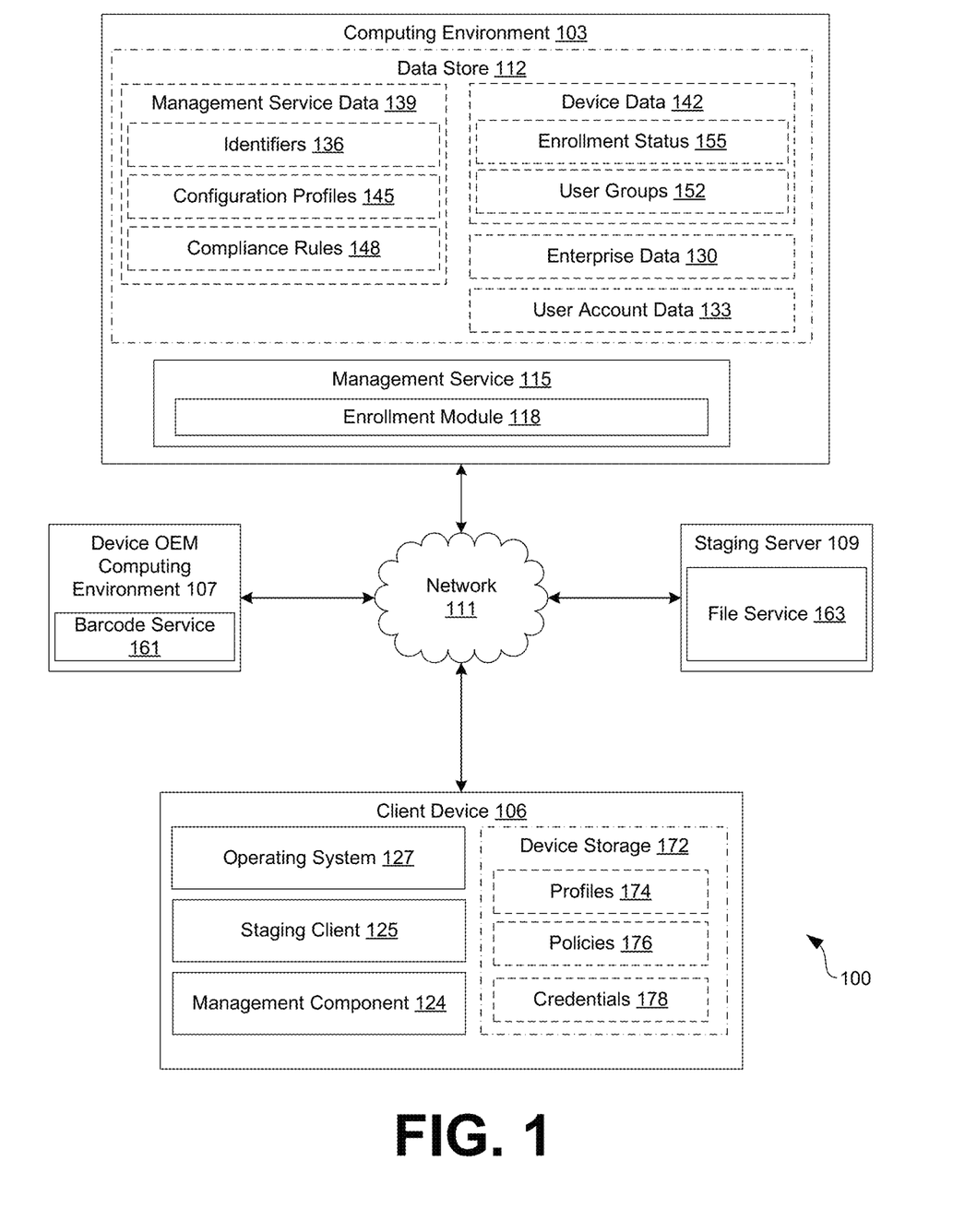
FIG. 1 is a drawing of a networked environment according to examples of the disclosure.

With reference to FIG. 1, shown is an example of a networked environment 100. The networked environment 100 can include a computing environment 103, a client device 106, a device OEM computing environment 107, and a staging server 109 in communication with one another over a network 111. The network 111 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 111, the computing environment 103 can be described as a "remote" computing environment 103.

The computing environment 103 can include a data store 112. The data store 112 can include memory of the computing environment 103, mass storage resources of the computing environment 103, a database or data storage service that is accessible to the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, an enrollment module 118, as well as other applications, services, processes, systems, engines, or functionality not discussed in detail herein. The management service 115 can be executed to oversee the operation of client devices 106 enrolled with the management service 115. In some embodiments, an enterprise, such as one or more companies or other organizations, can operate the management service 115 to oversee or manage the operation of the client devices 106 of its employees, contractors, customers, or other users having user accounts with the management service 115.

The management service 115 can cause various software components to be installed on a client device 106. Such software components can include, for example, client applications, resources, libraries, drivers, device configurations, or other similar components that require installation on the client device 106 as specified by an administrator of the management service 115. The management service 115 can further cause policies to be implemented on a client device 106.

Policies can include, for example, restrictions or permissions pertaining to capabilities of a client device 106 such that access to enterprise data is secured on the client device 106. For example, a policy can include providing access to enterprise data when a client device 106 is in a particular location of an office building during a predefined time window (e.g., between 9:00 AM and 5:00 PM). Also, the policy can include denying access to enterprise data when the client device 106 is not in the location of an office building or outside a time of the predefined time window. Policies can further include enabling or disabling certain functions on the client device 106. In one example, a policy can deny camera or audio recording functions when the client device 106 is at a particular location. Other policies can be implemented, as can be appreciated. The policies can be configured by the administrator depending on the interests or security policies of the enterprise.

The management service 115 can interact with one or more client applications executed on the client device 106. In one example, the management service 115 interacts with a management component 124 on the client device 106 to enroll the client device 106 with the management service 115. When enrolled, the management component 124 can be registered as a device administrator of the client device 106, which can provide the management component 124 with sufficient privileges to control the operation of the client device 106. In one example, the management component 124 can be registered as the device administrator through the installation of a management profile at the operating system of the client device 106 that causes an operating system 127 of the client device 106 to designate the management component 124 as the device administrator.

The management service 115 can direct the management component 124 to perform device management functions on the client device 106. For example, the management service 115 can direct the management component 124 to control access to certain software or hardware functions available on the client device 106. As a result, the management service 115 can verify that the configuration and operation of the client device 106 is in conformance with predefined criteria that ensures that enterprise data, or other data, is protected from data loss, unauthorized access, or other harmful events.

The management service 115 can further provision enterprise data 130 to the client device 106 through the management component 124. In one example, the management service 115 can cause the management component 124 to control use of the client device 106 or provision enterprise data 130 to the client device 106 through use of a command queue provided by the management service 115. In some examples, the management service 115 can store commands in a command queue associated with a particular client device 106 and can configure the management component 124 executed by the client device 106 to retrieve the contents of the command queue. In another example, the management component 124 can be configured to retrieve the contents of the command queue on a configured interval, such as every four hours, or upon detection of a certain event, such as detection of an unauthorized application being executed by the client device 106.

In any case, the management component 124 can retrieve the contents of the command queue by checking in with the management service 115 and requesting the contents of the command queue. In one example, the contents of the command queue can include a command that the management component 124 should cause to be executed on the client device 106. In another example, the contents of the command queue can include a resource or client application that the management component 124 should cause to be installed on the client device 106, which the client device 106 may access through a specified uniform resource locator (URL).

The enrollment module 118 can facilitate enrollment of the client device 106 with the management service 115, such that the management service 115 can oversee configuration and management of the client device 106. The enrollment module 118 can be executed as a module or as functionality of the management service 115. To this end, the enrollment module 118 can maintain user account data 133 for users of the client devices 106. The user account data 133 can include, for example, a username, an email address, a password, biometric information, or other authentication data. Additionally, the enrollment module 118 can maintain a mapping of an identifier 136a . . . 136b that uniquely identifies a client device 106 for a user account.

The enrollment module 118 can also generate enrollment data that specifies the parameters needed for a staging client 125 on the client device 106 to initiate and complete enrollment of a client device 106 with the management service. The enrollment data can be generated from information about a particular client device 106 or a type of client device 106 that is stored in the data store 112 as device data 142. The enrollment data can specify a particular OG that the device should be associated with, a username and/or password needed to authenticate the client device 106 with the management service 115 to complete enrollment of the client device 106, and other data as will be described below.

The enrollment data can also contain a reference to the staging server 109 along with commands or scripts that instruct the staging client 125 to download certain data, applications, profiles, etc., from a file service 163 running on the staging server 109. The file service 163 can be a file transfer protocol (FTP) or other service from which the staging client 125 or other applications running on the client device 106 can obtain files that are used to configure and set up the client device 106 for use by end users. In this sense, the enrollment data can be one or more commands that instruct the staging client 125 to download certain data from a particular server address that corresponds to the file service 163. Accordingly, an administrator can place the required files and/or applications that are needed to complete setup of the device onto the staging server 109 so that the staging client 125 can access these files.

The enrollment module 118 can request an enrollment barcode from a barcode service 161 executed by the device OEM computing environment 107. The barcode service 161 can generate a proprietary barcode that can be decoded by the staging client 125 on the client device 106. The enrollment barcode can be generated from the enrollment data and include the enrollment data encoded according to an algorithm performed by the barcode service 161. The method used to generate the enrollment barcode is often held as a proprietary process or algorithm by the device OEM.

The enrollment barcode can then be provided to an end user for scanning using the staging client 125. In one scenario, the enrollment barcode can be provided along with instructions for a user to launch the staging client 125 and scan the enrollment barcode. In another scenario, the staging client 125 can be configured to automatically launch when the end user powers up the device. The staging client 125 can then prompt the user to scan an enrollment barcode for setup of the device.

The data stored in the data store 112 can include, for example, management service data 139, device data 142, enterprise data 130, and user account data 133, as well as other data. The management service 115 includes information pertaining to management of the client devices 106 enrolled with the management service 115. To this end, the management service data 139 can include, for example, identifiers 136, configuration profiles 145, compliance rules 148, as well as other data.

Configuration profiles 145 include settings specified by an administrator of the management service 115 for configuration of individual ones of the client devices 106. For instance, the configuration profiles 145 can indicate particular client applications, drivers, or other software components to be installed on the client device 106. Additionally, the configuration profiles 145 can include other settings for the client device 106. Configuration of the client device 106 can be performed by the management component 124, as specified by an applicable configuration profile 145. Through an administrator console, an administrator can create a configuration profile 145 for a client device 106, a group of client devices 106, or a user group 152. As can be appreciated, some client devices 106 can be configured differently than other client devices 106. In some examples, a configuration profile 145 can include an extensible markup language (XML) document, or other suitable type of file, that can be communicated to the client device 106 or otherwise accessed by the management component 124.

The compliance rules 148 can include constraints specified by an administrator for a client device 106 to be in "compliance" with the management service 115. The compliance rules 148 can include criteria specified by the administrator or other criteria. In one example, the management component 124 can configure hardware or software functionality of a client device 106 such that the client device 106 is in conformance with the compliance rules 148. For instance, an administrator can specify particular types of software updates that are automatically installed on the client devices 106. Additionally, the management component 124 can identify when the client device 106 is not in conformance with the compliance rules 148, as well as other policies, and can take appropriate remedial actions, such as denying access to enterprise data 130, denying installation of a software update, or other features of the management component 124.

In some examples, the management service 115 communicates with the management component 124 or other application executable on the client device 106 to determine whether vulnerabilities exist on the client device 106 that do not satisfy compliance rules 148. Vulnerabilities can include, for example, the presence of a virus or malware on the client device 106, the client device 106 being "rooted" or "jailbroken" where root access is provided to a user of the client device 106, the presence of particular applications or files, questionable device configurations, vulnerable versions of applications, or other vulnerabilities that might be detectable by the management component 124 or operating system 127.

Device data 142 can include, for example, data pertaining to an enrollment status 155 for individual ones of the client devices 106. In one example, a client device 106 designated as "enrolled" can be permitted to access the enterprise data 130 while a client device 106 designated as "not enrolled," having no designation, or "enrolled" but not in compliance with the compliance rules 148 can be denied access to the enterprise data 130. Device data 142 can also include data pertaining to user groups 152, which can include groups of client devices 106 belonging to an organizational unit, such as information technology (IT), sales, marketing, or other appropriate arrangement for an enterprise or organization. An administrator can specify one or more of the client devices 106 as belonging to a particular user group 152 through an administrator console.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, a ruggedized computing device, a barcode scanning device, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can execute an operating system 127 configured to execute various software, such as the management component 124 or other applications. The client device 106 can also include drivers, such as device drivers or software drivers, that operate or control hardware devices coupled to the client device 106 or software installed thereon. Further, other applications can include device management applications, enterprise applications, social networking applications, word processors, spreadsheet applications, media viewing applications, or other applications.

The client device 106 can also be preconfigured from an OEM with the staging client 125. The staging client 125 can interpret enrollment barcodes that are generated by the barcode service 161 and execute the commands that perform initial setup of the client device 106. The staging client 125 can issue commands to other applications that are installed on the client device 106 using interprocess communication protocols, such as by using an Android intent messaging object to send data to another application. The staging client 125 can also download and install applications, configuration profiles (e.g., WiFi profiles, management profiles), or credentials from the staging server 109.

The client device 106 can also include device storage 172. The client device 106 can store various data within device storage 172, such as profiles 174, policies 176, and credentials 178. Profiles 174 can include configuration profiles that are installed on the client device 106 by the management component 124 or by the staging client 125. For example, the staging client 125 can install a management profile that initiates enrollment of the client device 106 with the management service 115. The staging client 125 can install the management profile in response to a command embedded within an enrollment barcode scanned by the staging client 125.

Policies 176 can include security policies or other types of policies that can be enforced by the management component 124 on behalf of the management service 115 on an enrolled client device 106. Credentials 178 can include encryption keys, certificates, tokens, password, or other types of credentials that can be stored within the device storage 172 for use by the client device 106.

The device OEM computing environment 107 represents one or more computing devices that can be operated by an OEM of the client device 106. The OEM computing environment 107 can execute the barcode service 161, which represents a service provided by or on behalf of the OEM to generate barcodes that can be interpreted by the staging client 125. The barcodes can be generated using a proprietary protocol and/or encrypted using a key that is only accessible to the staging client 125.

Next, a general description of the operation of the various components of the networked environment 100 is provided. In some situations, an enterprise may wish to deploy various client devices 106 sold by a particular OEM. The devices might be provided with a particular operating system 127, such as ANDROID or IOS, but the OEM might be unwilling to customize the software and settings of the client device 106 for the enterprise. In other words, the client devices 106 might be obtained by the enterprise without the various applications and configurations on the client device 106 preinstalled on the devices. In this scenario, the OEM may provide a staging client 125 on the client device that is configured to scan a barcode that includes configuration commands and parameters that the staging client 125 can use to perform initial setup of the client device 106.

The enrollment barcode can be generated by requesting a barcode from the barcode service 161 using an application programming interface (API). Accordingly, the enrollment module 118 can provide enrollment data to the barcode service 161 based upon device data 142 and management service data 139 that specifies the various enrollment parameters for the client device 106. The enrollment parameters can include a server address for the management service 115, an OG to which the device is assigned, a username/password for enrolling the client device 106, a reference to the staging server 109 and an identity of applications, data, or other information that the staging client 125 should download to complete initial setup of the client device 106. The enrollment data can also include one or more commands that staging client 125 can perform to initiate or complete enrollment of the client device 106 with the management service 115.

In one example, the commands can be Android intent message objects which cause specific actions to be performed by a particular application. In this case, enrollment data can specify that the management component 124 should be downloaded and installed from the staging server 109, and the Android intent message object can be a reference to one or more commands within the management component 124 that initiate or complete enrollment of the client device 106 with the management service 115. The commands can include one or more credentials with which the management component 124 can authenticate itself with the management service 115. In some examples, the credentials can be encrypted within the enrollment data that is provided to the barcode service 161 so that the enrollment barcode does not include the credentials in the clear. In this case, the credentials can be encrypted using a private key that the management component 124 can access but that the staging client 125 and barcode service 161 are unable to access. The credentials can be staging credentials that are not specific to any particular end user but that facilitate enrollment and setup of the client device 106. Additionally, other data provided to the barcode service 161 that is private to the management service 115 and management component 124 can also be encrypted or otherwise secured so that it is not accessible to staging client 125.

Therefore, the staging client 125 can facilitate enrollment and initial setup of the client device 106 with minimal user interaction. The enrollment module 118 can provide the enrollment data from which the enrollment barcode is generated. The enrollment barcode can subsequently be provided to a user, who can scan the enrollment barcode using the staging client 125, which can cause the device to become enrolled with the management service 115 by way of a management component 124 that is downloaded and installed from the staging server 109.

Figure 2:
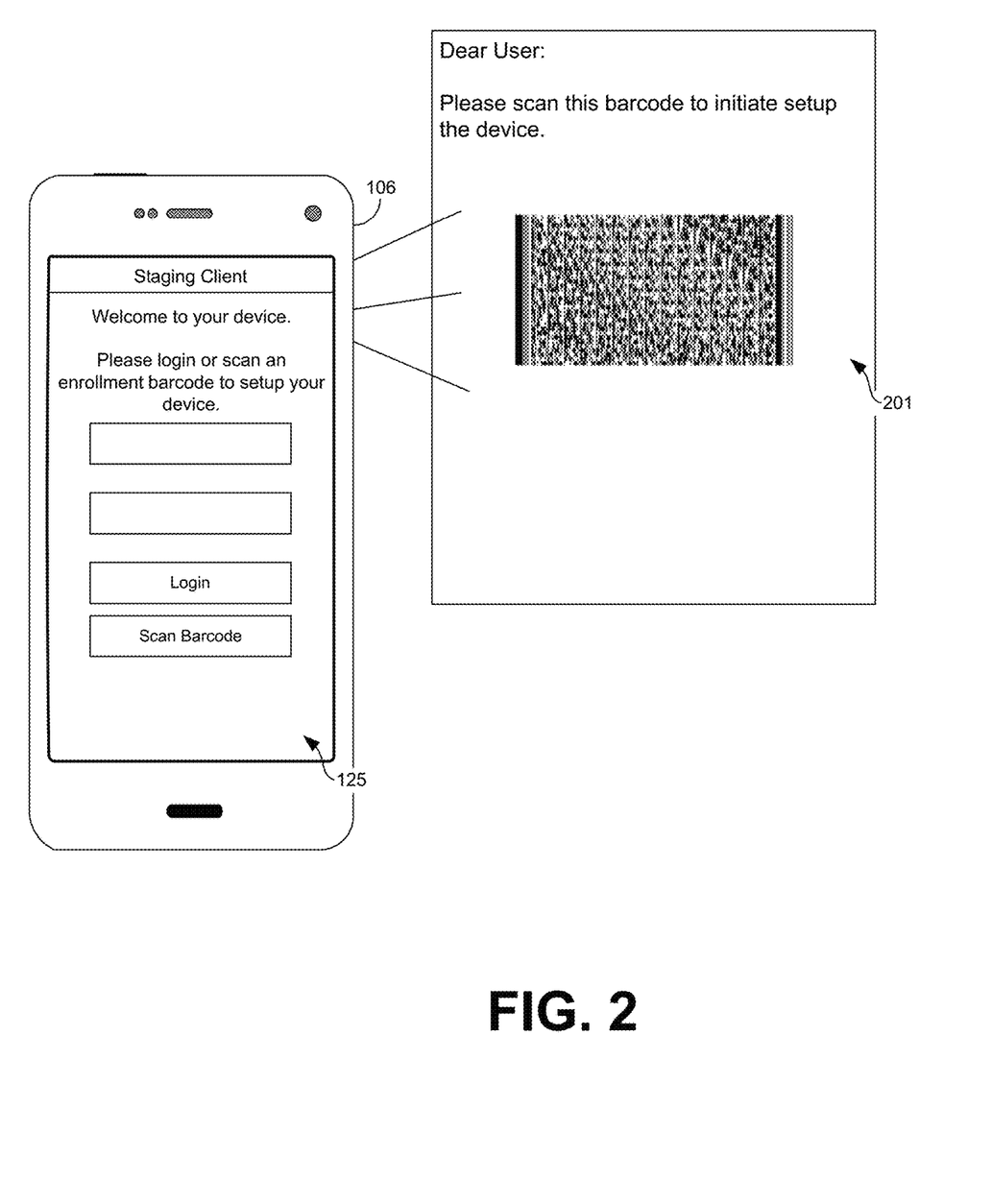
FIG. 2 is a drawing of an enrollment barcode and client device according to examples of the disclosure.

Referring next to FIG. 2, shown is an example of an enrollment barcode 201 that can contain the enrollment data from which the client device 106 can be setup and enrolled as a managed device. The enrollment barcode 201 can comprise a two-dimensional barcode, a stacked linear barcode, such as a PDF417 barcode, or any other barcode in which data can be embedded. The enrollment barcode 201 can be generated by the barcode service 161 in a proprietary format that is private to the barcode service 161.

In one scenario, the enrollment barcode 201 can be encrypted or otherwise secured such that is can only be decrypted or interpreted by the staging client 125 without reverse engineering the barcode format, potentially violating a terms of service of the OEM. Accordingly, as shown in FIG. 2, the staging client 125 can prompt the user to scan the enrollment barcode 201. The staging client 125 can be instrumented to interpret the enrollment barcode 201 and perform the enrollment and/or configuration commands that are embedded therein.

The enrollment barcode 201 can include a reference (e.g. server address) to the staging server 109 and certain applications and data that the staging client 125 should install into the client device 106 from the staging server 109 or another application or data repository. Additionally, the enrollment barcode 201 can include one or more configuration or enrollment commands (e.g., Android intent message objects), that the staging client 125 can invoke on the client device 106, which can cause the management component 124 to initiate or complete enrollment of the client device 106. In one scenario, where authentication credentials are provided to the management component 124 using the staging client 125, these credentials can be encrypted or secured using an encryption key that is inaccessible to the staging client 125 and that is private to the management component 124 and/or management service 115. Additionally, other enrollment parameters, such as OG, a server address of the management service 115, and other data can also be secured such that it is private to the management component 124 and management service 115.

Figure 3:
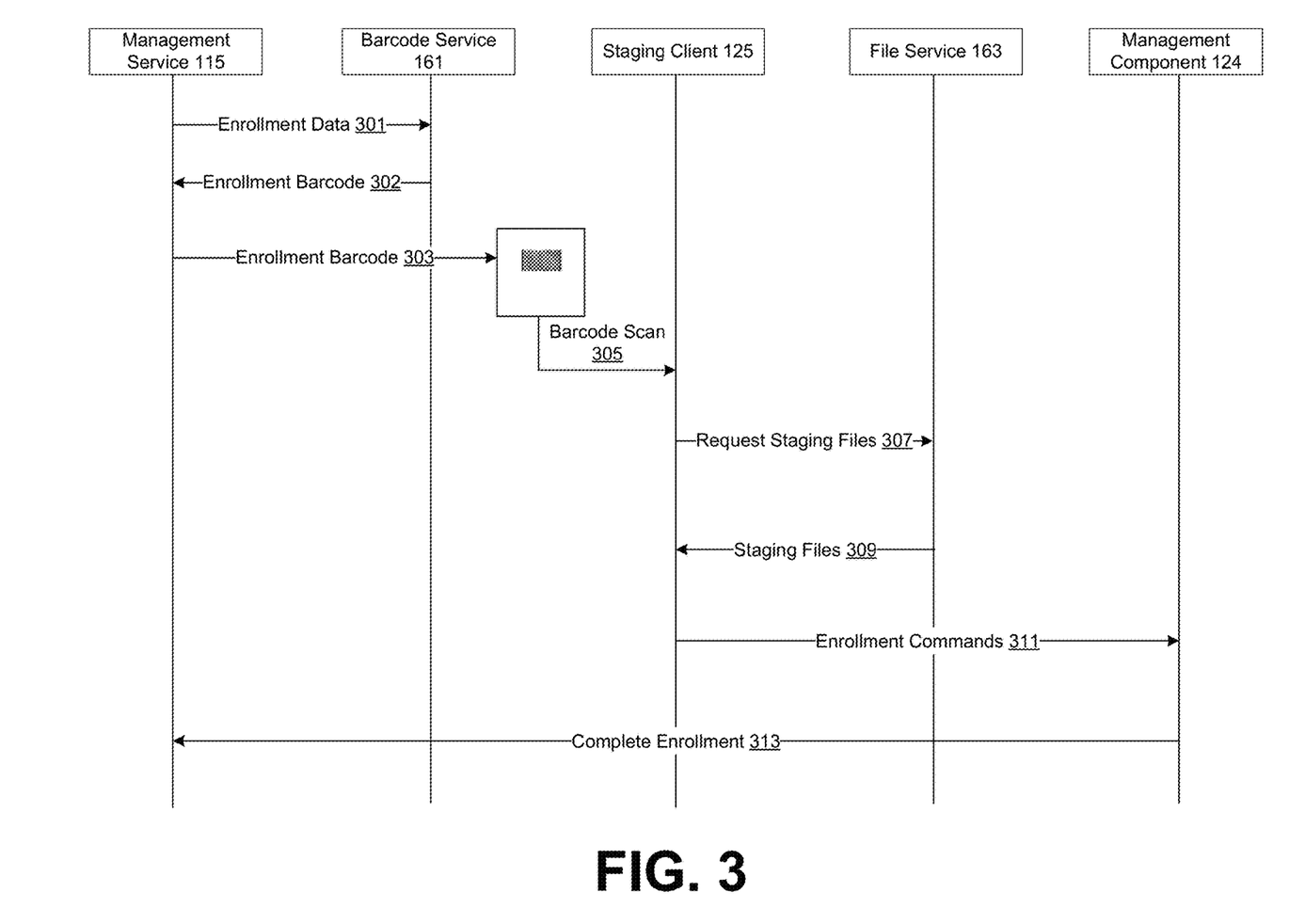
FIG. 3 is a sequence diagram illustrating functionality implemented by components of the networked environment.

Referring next to FIG. 3, shown is a sequence diagram that illustrates various interactions between the components of the computing environment 100 of FIG. 1. FIG. 3 illustrates how a client device 106 can become enrolled with the management service 115. The enrollment module 118 can perform some of the functionality shown in FIG. 3 as originating with the management service 115. First, at step 301, the management service 115 can provide enrollment data to the barcode service 161. The enrollment data can be provided as a part of a request to the barcode service 161 to generate a barcode that can be interpreted by the staging client 125. Again, the process for creating a barcode can vary from OEM to OEM and might also be kept as a proprietary process, which could necessitate requesting the barcode from the barcode service 161.

The enrollment data provided to the barcode service at step 301 can include the enrollment parameters needed by the management component 124, once installed on the client device 106, to complete enrollment of the client device with the management service 115. The enrollment parameters that an administrator deems as sensitive information, such as credentials, server addresses, or other information that is not needed by the staging client 125 or that the administrator wishes to keep private from the staging client 125, can be encrypted within the enrollment data. The enrollment data can also include a script that instructs the staging client 125 to install certain applications on the client device 106, such as the management component 124. The enrollment data can also include a reference to the download location of the management component 124 or other application. The enrollment data can also include commands to invoke the management component 124 to complete enrollment of the client device 106 with the management service 115. The enrollment data can be provided in a format specified by the barcode service 161 and that is consistent with an API provided by the barcode service 161.

At step 302, the barcode service 161 can respond to the management service 115 with an enrollment barcode. The enrollment barcode can a quick response code, a 2-dimensional barcode, or any other format in which data can be embedded and interpreted by the staging client 125. The enrollment barcode can also be encrypted or secured by the barcode service 161 using an encryption methodology or encryption key that is private to the barcode service 161 and/or staging client 125.

At step 303, the management service 115 can provide the enrollment barcode to an end user. In one scenario, providing the barcode can take the form of showing the barcode on a management console user interface. In another scenario, an administrator can provide the barcode to an end user along with instructions to scan the barcode using the staging client 125. In many cases, the enrollment barcode can be provided in a format that allows for printing the barcode for the convenience of the end user.

At step 305, the user can scan the enrollment barcode using the staging client 125. The staging client 125 can interpret the data within the enrollment barcode and perform the actions that are embedded within the barcode. For example, as noted above, the staging client 125 can download applications, profiles, and other data from the staging server 109. The staging client 125 can also invoke certain actions in other applications that it installs on the client device 106 through an interprocess communication protocol, such as through Android intent messaging.

Accordingly, at step 307, the staging client 125, in response to scanning the enrollment barcode, can request staging files from the file service 163. In this context, staging files mean applications, profiles, and other data needed by the staging client 125 to initiate configuration and setup of the client device 106. The staging files can include the management component 124, a management profile that is installed on the client device 106, and other applications that the administrator deems as necessary on the client device 106 for the configuration and enrollment process.

At step 309, the file service 163 can provide the requested staging files to the client device 106. The requested staging files can provided using a file transfer or file sharing protocol to the staging client 125, which can save the files and install the applications on the device that are necessary to complete enrollment of the client device 106, such as the management component 124.

At step 311, after the staging client 125 has installed the management component 124 on the client device 106, the staging client 125 can invoke enrollment commands within the management component 124 that cause the client device 106 to become enrolled with the management service 115. The enrollment commands can be invoked using Android intents. In this scenario, a particular action within the management component 124 can be activated the initiates enrollment with the management service 115. Parameters can also be passed to the management component 124 by the staging client 125 that are embedded within the enrollment barcode, such as a username, password, OG, server address for the management service 115, or other information needed by the management component 124 to initiate or complete enrollment of the client device 106 with the management service 115. The parameters can be encrypted or secured using a key that is unavailable to the barcode service 161 or staging client 125 to maintain security of the parameters. At step 313, the management component 124 can complete enrollment of the client device 106 with the management service 115 as a managed device.

Figure 4:
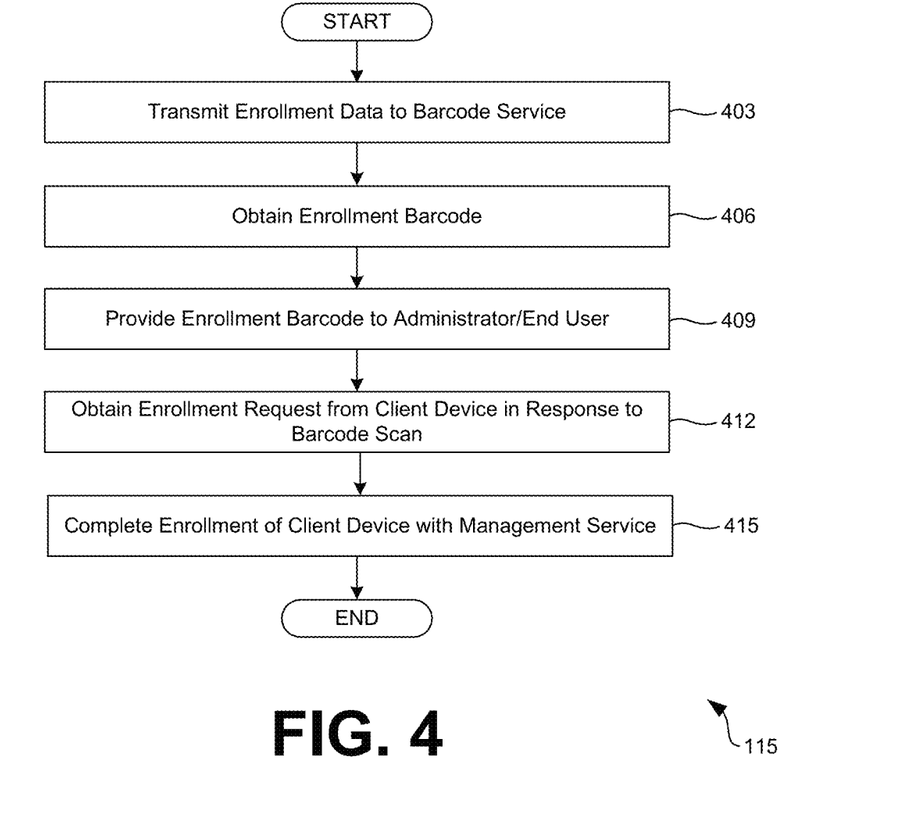
FIG. 4 is a flowchart illustrating an example of operation of a portion of a management service according to examples of the disclosure.

Moving on to FIG. 4, shown is a flowchart that provides one example of the operation of a portion of the management service 115 to provide enrollment data to the barcode service 161 and complete enrollment of a client device 106. The flowchart of FIG. 4 can be viewed as depicting an example of elements of a method implemented by the management service 115 or other suitable software component according to one or more examples. The separation or segmentation of functionality as discussed herein is presented for illustrative purposes only.

At step 403, the management service 115 can provide enrollment data to the barcode service 161. The enrollment data can be provided in a request to generate an enrollment barcode in a format that can be interpreted by the staging client 125. Again, the enrollment data can include a reference to the staging server 109 or other file repository, an identity of applications that the staging client 125 should install on the client device 106, and other commands that the staging client 125 can execute to setup the client device 106 on behalf of the enterprise.

At step 406, the management service 115 can obtain the enrollment barcode from the barcode service 161. The enrollment barcode can be formatted in a format that can be interpreted by the barcode service 161. However, the format might be encrypted or secured in a manner that renders it unusable to other applications or services.

At step 409, the management service 115 can provide the enrollment barcode to an administrator or end user. The enrollment barcode can be provided through a management console user interface provided by the management service 115 to an administrator. The enrollment barcode can also be provided by the administrator to a population of end users along with client devices 106 that are being deployed by the enterprise. For example, the enrollment barcode can be emailed or printed to end users along with instructions to simply scan the enrollment barcode using the staging client 125, which will result in the setup and enrollment of the client device 106 without the end user needing to take additional action to complete the enrollment of the client device 106.

At step 412, the management service 115 can obtain an enrollment request from the client device 106. The enrollment request can be obtained in response to the end user scanning the enrollment barcode using the staging client 125, which can cause the staging client 125 to install the management component 124 and invoke one or more commands in the management component 124 to initiate or complete enrollment of the client device 106. The enrollment request can include credentials and in some cases an OG to which the device should be assigned, which can both be embedded in the enrollment barcode provided to the end user.

At step 415, the management service 115 can complete enrollment of the client device 106 using the enrollment parameters contained in the enrollment request. The client device 106 can now be managed by the management service 115 and provisioned with various applications and data that are required by the enterprise on the client device 106.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the management service 115, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Although the management service 115, the management component 124, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device; and
   a management service executable by the at least one computing device, the management service causing the at least one computing device to at least:
   transmit, to a barcode service, enrollment data that specifies enrollment parameters for an enrollment of a client device with a management service, the enrollment parameters comprising a staging credential, wherein the staging credential provided to the barcode service is encrypted using a private key accessible to the management service;
   obtain an enrollment barcode from the barcode service, the enrollment data being embedded in the enrollment barcode; and
   in an instance in which the enrollment barcode is interpreted or scanned by the client device, cause a management component installed on the client device to authenticate to the management service with the staging credential embedded in the enrollment barcode, and cause the enrollment of the client device with the management service.

2. The system of claim 1, wherein the enrollment data further comprises at least one of:
   a server address of the management service, an organizational group to which the client device is assigned, a username, a password, a reference to a staging server, or an identity of an application or data that the client device downloads to complete an initial setup of the client device.

3. The system of claim 2, wherein the enrollment data comprises the server address of the management service, wherein the server address comprises an address from which the client device accesses content for the enrollment of the client device with the management service.

4. The system of claim 1, wherein:
   cause the enrollment of the client device with the management service comprises to cause the at least one computing device to at least:
   transmit the enrollment data including a command that, when executed by a staging client on the client device, initiates or completes the enrollment of the client device with the management service.

5. The system of claim 4, wherein the staging client is unable to access the key with which the staging credential is encrypted or secured.

6. The system of claim 4, wherein the enrollment data further comprises data decoded by the staging client.

7. The system of claim 1, wherein the enrollment data comprises a staging credential that is encrypted or secured using a key that the barcode service is unable to access.

8. A method, comprising:
   transmitting, to a barcode service, enrollment data that specifies enrollment parameters for an enrollment of a client device with a management service, the enrollment parameters comprising a staging credential, wherein the staging credential provided to the barcode service is encrypted using a private key accessible to the management service;
   obtaining an enrollment barcode from the barcode service, the enrollment data being embedded in the enrollment barcode; and
   in an instance in which the enrollment barcode is interpreted or scanned by the client device, causing a management component installed on the client device to authenticate to the management service with the staging credential embedded in the enrollment barcode, and causing the enrollment of the client device with the management service.

9. The method of claim 8, wherein the enrollment data further comprises at least one of:
   a server address of the management service, an organizational group to which the client device is assigned, a username, a password, a reference to a staging server, or an identity of an application or data that the client device can download to complete an initial setup of the client device.

10. The method of claim 9, wherein the enrollment data comprises the server address of the management service, wherein the server address comprises an address from which the client device can access content for the enrollment of the client device with the management service.

11. The method of claim 8, wherein:
   causing the enrollment of the client device with the management service comprises:
   transmitting the enrollment data including a command that, when executed by a staging client on the client device, initiates or completes the enrollment of the client device with the management service.

12. The method of claim 11, wherein the staging client is unable to access the key with which the staging credential is encrypted or secured.

13. The method of claim 11, wherein the enrollment data further comprises data decoded by the staging client.

14. The method of claim 11, wherein the enrollment data comprises a staging credential that is encrypted or secured using a key that the barcode service is unable to access.

15. A non-transitory computer-readable medium embodying program code executable in at least one computing device that, when executed by the at least one computing device, causes the at least one computing device to at least:
: transmit, to a barcode service, enrollment data that specifies enrollment parameters for an enrollment of a client device with a management service, the enrollment parameters comprising a staging credential, wherein the staging credential provided to the barcode service is encrypted using a private key accessible to the management service;
: obtain an enrollment barcode from the barcode service, the enrollment data being embedded in the enrollment barcode; and
: in an instance in which the enrollment barcode is interpreted or scanned by the client device, cause a management component installed on the client device to authenticate to the management service with the staging credential embedded in the enrollment barcode, and cause the enrollment of the client device with the management service.

16. The non-transitory computer-readable medium of claim 15, wherein the enrollment data comprises at least one of:
: a server address of the management service, an organizational group to which the client device is assigned, a username, a password, a reference to a staging server, or an identity of an application or data that the client device downloads to complete an initial setup of the client device.

17. The non-transitory computer-readable medium of claim 15, wherein:
: cause the enrollment of the client device with the management service comprises to cause the at least one computing device to at least:
: : transmit the enrollment data including a command that, when executed by a staging client on the client device, initiates or completes the enrollment of the client device with the management service.

18. The non-transitory computer-readable medium of claim 17, wherein the staging client is unable to access the key with which the staging credential is encrypted or secured.

19. The non-transitory computer-readable medium of claim 17, wherein the enrollment data further comprises data decoded by the staging client.

20. The non-transitory computer-readable medium of claim 15, wherein the enrollment data comprises a staging credential that is encrypted or secured using a key that the barcode service is unable to access.

* * * * *